United States Patent
Benoit et al.

(10) Patent No.: US 9,779,401 B2
(45) Date of Patent: Oct. 3, 2017

(54) NETWORK ACCESS AUTHENTICATION USING A POINT-OF-SALE DEVICE

(71) Applicant: QUALCOMM Incorporated, San Diego, CA (US)

(72) Inventors: Olivier Jean Benoit, San Diego, CA (US); Peerapol Tinnakornsrisuphap, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 475 days.

(21) Appl. No.: 14/463,276

(22) Filed: Aug. 19, 2014

(65) Prior Publication Data
US 2016/0055485 A1   Feb. 25, 2016

(51) Int. Cl.
| H04L 29/06 | (2006.01) |
| G06Q 20/40 | (2012.01) |
| H04W 12/04 | (2009.01) |
| H04W 12/06 | (2009.01) |
| G06Q 20/20 | (2012.01) |
| G06Q 20/32 | (2012.01) |

(52) U.S. Cl.
CPC .......... *G06Q 20/401* (2013.01); *G06Q 20/20* (2013.01); *G06Q 20/3278* (2013.01); *H04L 63/045* (2013.01); *H04L 63/061* (2013.01); *H04W 12/04* (2013.01); *H04W 12/06* (2013.01); *G06Q 2220/12* (2013.01); *H04L 63/18* (2013.01)

(58) Field of Classification Search
CPC .................................................. G06C 20/401
See application file for complete search history.

(56) References Cited

U.S. PATENT DOCUMENTS

| 5,859,779 | A | * | 1/1999 | Giordano | ............. G06Q 20/341 700/231 |
| 7,024,396 | B2 | | 4/2006 | Woodward | |
| 7,395,427 | B2 | | 7/2008 | Walker | |
| 8,516,267 | B2 | * | 8/2013 | Spalka | ................ G06F 21/6245 713/189 |
| 8,532,304 | B2 | | 9/2013 | Asokan et al. | |
| 2002/0009199 | A1 | * | 1/2002 | Ala-Laurila | .......... H04L 63/061 380/247 |
| 2004/0240412 | A1 | | 12/2004 | Winget | |
| 2008/0319869 | A1 | * | 12/2008 | Carlson | .................. G06Q 20/02 705/26.1 |
| 2009/0307140 | A1 | * | 12/2009 | Mardikar | ........... G06Q 20/1085 705/71 |

(Continued)

OTHER PUBLICATIONS

"PCT Application No. PCT/US2015/44894 International Search Report", Nov. 5, 2015, 12 pages.

(Continued)

*Primary Examiner* — Shawnchoy Rahman
(74) *Attorney, Agent, or Firm* — DeLizio Law, PLLC

(57) ABSTRACT

A user device can be configured for network access, such as for guest network access. In one example, a first device receives an indication of a transaction that uses the first device. The first device communicates a request for network access to an access point of the network in response to receiving the indication of the transaction. The first device then receives a first key from the access point. The first device provides the first key to the user device. The user device is to use the first key to obtain the network access to the network.

30 Claims, 7 Drawing Sheets

(56) References Cited

U.S. PATENT DOCUMENTS

| | | | |
|---|---|---|---|
| 2011/0154056 A1* | 6/2011 | Spalka | G06F 21/6245 |
| | | | 713/189 |
| 2012/0284193 A1 | 11/2012 | Bharghavan et al. | |
| 2012/0316963 A1* | 12/2012 | Moshfeghi | G06Q 20/20 |
| | | | 705/14.58 |
| 2013/0036231 A1 | 2/2013 | Suumaki | |
| 2014/0372308 A1* | 12/2014 | Sheets | G06Q 20/40 |
| | | | 705/44 |
| 2015/0221149 A1* | 8/2015 | Main | G07C 9/00119 |
| | | | 340/5.61 |

OTHER PUBLICATIONS

"Authentication using QR code and mobile device", IP.com Prior Art Database Disclosure, IP.com Disclosure No. IPCOM000226313D, Mar. 27, 2013, 6 pages.

"Method and System for Restricted Wi-Fi Access", IP.com Prior Art Database Disclosure, IP.com Disclosure No. IPCOM000228694D, Jun. 30, 2013, 6 pages.

Beth, Jackson , "Captive Portal: Guest Access on Wireless Networks", http://www.securedgenetworks.com/secure-edge-networks-blog/bid/56318/Captive-Portal-Guest-Access-on-Wireless-Networks, Apr. 7, 2011.

* cited by examiner

NETWORK ACCESS AUTHENTICATION USING A POINT-OF-SALE DEVICE

BACKGROUND

Embodiments of this disclosure generally relate to the field of communication systems and, more particularly, to configuring communication devices for use within a communication network.

At times, a user may want to connect a computing device to a guest network to gain access to the Internet and other network resources. In order to connect to the guest network, the user may participate in an authentication procedure to cause the user's computing device to gain access to the network resources available through an access point (AP) of the guest network. One authentication procedure includes a user entering a passphrase onto the user's computing device. However, it is usually cumbersome for the user to enter a passphrase on the computing device. Furthermore, the user can share the passphrase with others, making the passphrase less secure.

Another authentication procedure includes redirecting a browser on the user's computing device to a captive portal for authentication. However, this procedure can result in undefined behavior for web pages that have been loaded into the browser prior to the authentication process. To avoid the undefined behavior, the user typically has to remember to refresh or restart the browser during the authentication procedure in order to load the captive portal on the browser. In addition, the captive portal can be exploited with a packet sniffer. Both of the authentication procedures described above rely on passwords for user authentication. These passwords are typically weak, and can be guessed by a hostile party. Once the password is known, the hostile party can set up a rogue AP that impersonates the legitimate AP, resulting in a security threat to the user.

SUMMARY

Disclosed are various embodiments of configuring a user device for network access, such as for guest network access. In one embodiment, a first device receives an indication of a transaction that uses the first device. The first device communicates a request for network access to an access point of the network in response to receiving of the indication of the transaction. The first device then receives a first key from the access point. The first device provides the first key to the user device. The user device is to use the first key to obtain network access to the network.

In another embodiment, a first device of a network communicates a request for network access to an access point of the network. The first device receives a first key from the access point. The first device processes a payment transaction with a user device, including providing the first key to the user device and receiving a second key from the user device. The user device is to use the first key to obtain the network access to the network. The first device provides the second key to the access point.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
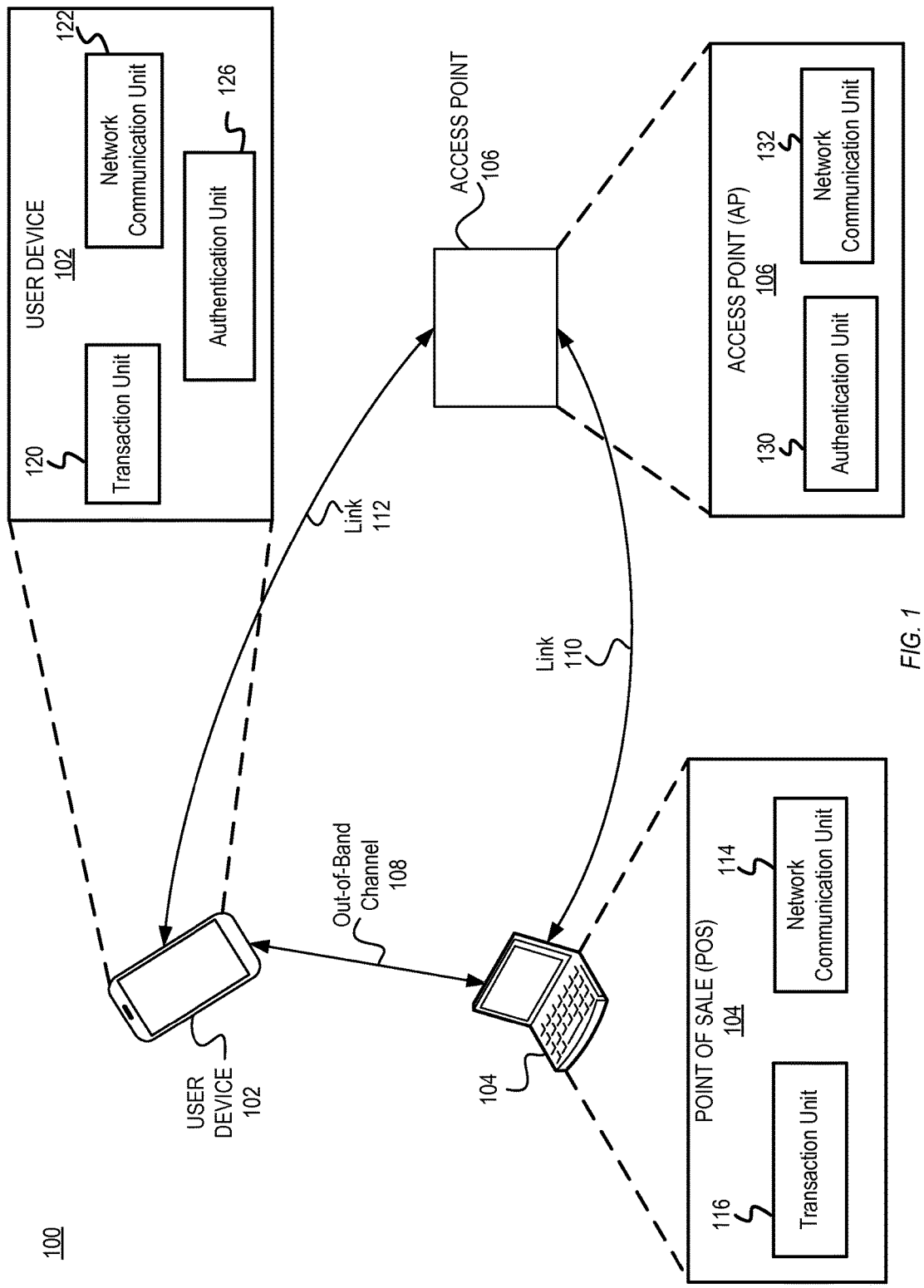
FIG. 1 is a diagram of an example system for configuring a device for network access.

The description that follows includes exemplary systems, methods, techniques, instruction sequences and computer program products that embody techniques of this disclosure. However, it is understood that the described embodiments may be practiced without these specific details. For instance, although some examples refer to obtaining network access to a wireless local area network (WLAN) using 802.11 communication protocols, in other embodiments, the network access operations described herein can be executed to obtain network access to other types of networks that implement other suitable communication protocols (e.g., Ethernet, powerline communication (PLC), long-term evolution (LTE), 3G, 4G, etc.). In other instances, well-known instruction instances, protocols, structures and techniques have not been shown in detail in order not to obfuscate the description.

A Point-of-Sale (POS) device can be used to facilitate a network access authentication process between an access point (AP) and a user device (e.g., a smart phone). The POS device can be used to exchange one or more keys between the AP and the user device. As described below, these keys can be used during the network access authentication process to authenticate the user device. Upon the user device being authenticated, network access (e.g., guest network access) can be provided to the authenticated user device. For example, network access can be provided via a wireless network (e.g., WLAN) or a wired network (e.g., Ethernet or powerline).

In one embodiment, a POS device can process a transaction between a customer and a merchant, such as for a purchase of goods or services. Upon receiving an indication of the transaction, the POS device can request network access (e.g., guest network access) from an AP. The AP can generate an AP key pair, and provide the POS device with a public key of the AP key pair. The POS device can provide the received public key to a user device over an out-of-band (OOB) channel. Once the user device receives the AP public key, the user device and the AP can initiate a key establishment process based on the AP key pair. The key establishment process can be used to generate a secure key (such as a pairwise master key (PMK)). The secure key can be used to authenticate the user device during a network security process. In this manner, the user device can be authenticated for network access without using cumbersome and unsecure passphrases and without using unreliable and unstable captive portals.

In one embodiment, a transaction between a customer and a merchant (or a service provider) can trigger network access authentication for a user device. In another embodiment, the user device can be configured for network access during a transaction between a customer and a merchant. The merchant typically uses a point-of-sale (POS) device to process the transaction. The customer typically has a user device, which may be used to complete the transaction with the POS device. Furthermore, embodiments are not limited to guest network access. Depending on the application, the user device can be provided with another type of network access, such as a full network access, an administrator network access, a temporary network access, a contractor network access, etc. Various aspects of the above network access authentication process are further described below.

FIG. 1 is a diagram of a system 100 for configuring a device for network access, according to some embodiments. In the system 100 shown in FIG. 1, a user device 102 can be involved in a customer transaction with a Point-of-Sale (POS) device 104. The user device 102 includes a transaction unit 120, a network communication unit 122 and an authentication unit 126. The POS device 104 includes a network communication unit 114 and a transaction unit 116. An access point (AP) 106 is configured to provide network access (e.g., guest network access) to the user device 102. The AP 106 includes an authentication unit 130 and a network communication unit 132. It is noted that one or more of the units of each of the devices 102, 104, and/or 106 can be implemented using software and/or hardware, such as described below with reference to FIG. 7. For example, a processor of a device (e.g., device 104) may execute instructions stored in a memory of the device to implement the functionality associated with one or more of the units (e.g., the transaction unit 116).

The user device 102 can take the form of any technically feasible electronic device that can transfer data through a communication network. For example, the user device 102 can be a mobile device, such as a smart phone, a laptop, a netbook, a tablet computer, a smart watch, and the like, that can be transported by a user. The POS device 104 can be a dedicated merchant computer, and the AP 106 can be a dedicated AP. Also, the POS device 104 and/or the AP 106 can be implemented using an electronic device such as a smart phone, a laptop, a netbook, a tablet computer, a smart appliance, and the like.

The POS device 104 is communicatively coupled to the AP 106 via a link 110. The network communication unit 114 of the POS device 104 can facilitate a portion of the network access authentication process by communicating with the network communication unit 132 of the AP 106 via the link 110. For example, the POS device 104 can communicate with the AP 106 to request network access and cause the authentication unit 130 of the AP 106 to generate keys. The user device 102 can perform another portion of the network access authentication process with the AP 106 via the link 112. For example, the user device 102 can use the authentication unit 126 to perform a key establishment process and/or a network security process with the authentication unit 130 via the link 112. The links 110 and 112 can be implemented using a wireless network, such as IEEE 802.11, long-term evolution (LTE), 3G, 4G, etc. The links 110 and 112 can also be implemented using a wired networking technology, such as Ethernet or powerline, etc.

Each of the network communication units 114, 122, and 132 can include a wireless interface that implements Zig-Bee®, IEEE 802.11, and/or Bluetooth® protocols. In some embodiments, the network communication units 114, 122, and 132 may also include a wired interface that implements Ethernet protocols and/or powerline communications (PLC) protocols (e.g., such as the protocols described by the HomePlug® standards). In some embodiments, the network communication unit 114, the network communication unit 132, and the network communication unit 122 can include one or more radio transceivers, analog front end (AFE) units, antennas, processors, memory, other logic, and/or other components to implement the communication protocols and related functionality.

The user device 102 can use the transaction unit 120 to communicate with the transaction unit 116 of the POS device 104 via an out-of-band (OOB) channel 108. For example, if the devices in the system 100 implement IEEE 802.11 protocols for communication, the transaction unit 120 can communicate with transaction unit 116 via the OOB channel 108 using Bluetooth protocols (i.e., a Bluetooth channel), Near Field Communication (NFC®) protocols (i.e., an NFC channel), infrared protocols (i.e., an infrared channel), etc. The transaction unit 116 of the POS device 104 can also provide information (e.g., key(s)) to the transaction unit 120 of the user device 102 via the OOB channel 108 using an optical channel, such as by using a paper receipt or as an image displayed on a display of the POS device 104. The transaction unit 116 can also, for example, print the information on a paper receipt using a QR code or a bar code, by displaying the QR code or a bar code on a display of the POS device 104, or the like. The transaction unit 116 can also provide information to the transaction unit 120 via the OOB channel 108 using a cellular channel, such as via email, Short Messaging Service (SMS) and/or Multimedia Messaging Service (MMS). It is noted that email can also be transmitted using a different channel, such as using a Bluetooth channel.

The POS device 104 can process a customer transaction between a customer and a merchant. The customer transaction can include a customer purchase of goods or services from a merchant using the POS device 104. The customer transaction can be performed with or without using the user device 102. In some examples, the customer transaction can be performed by using the POS device 104 but without using the user device 102, e.g., such as by the customer manually providing a payment to the POS device 104. In some examples, the customer transaction can also include a payment transaction, e.g., where the user device 102 is used to pay for the goods or services via the OOB channel 108. The customer transaction can include transferring data (such as customer's contact and/or payment data) and/or files between the user device 102 and the POS device 104.

The POS device 104 can receive an indication of the customer transaction. The indication can be generated by the user device 102 (such as by the transaction unit 120) and communicated to the POS device 104 (such as over the OOB channel 108). The indication can be implemented as a message, a notification, a control packet, etc. In some implementations, instead of being generated by the user device 102, the indication of the customer transaction can include payment data that is received by the POS device 104 from a credit card or a smart card reader. For example, the received payment data can include credit card or smartcard information. In another example, an indication of the customer transaction can be locally generated by the transaction unit 116 of the POS device 104 upon processing the customer transaction. For example, a flag in a predetermined location in the memory of the POS device 104 can be set to indicate the customer transaction when the transaction unit 116 processes a manual customer transaction (such as receiving payment from the customer).

In addition to processing the customer transaction, the POS device 104 can initiate a network access authentication process to provide network access (e.g., guest network access) to the user device 102. In one embodiment, the transaction unit 116 of the POS device 104 processes a customer transaction between a customer and a merchant, such as for a purchase of goods or services. Upon receiving an indication of the customer transaction, the network communication unit 114 can request network access for the user device 102 from the AP 106. The network communication unit 114 can communicate the network access request to the network communication unit 132 via a network, such as by using the link 110.

After receiving the network access request, the authentication unit 130 of the AP 106 can generate an AP key pair that includes an AP public key and an AP private key. The AP 106 can use the communication unit 132 to provide the AP public key to the network communication unit 114, such as by using the link 110. In one implementation, the AP key pair is an ephemeral key pair, i.e., where a new key pair is generated each time a key establishment process is performed. The AP 106 can use the AP private key during the key establishment process, such as described below with reference to FIG. 4.

The transaction unit 116 can provide the AP public key to the transaction unit 120 over the OOB channel 108. For example, the transaction unit 116 can print the AP public key on a receipt (such as by using a QR code), email, or text (i.e., using SMS or MMS) the AP public key to the transaction unit 120. Once the user device 102 receives the AP public key, the authentication unit 126 and the authentication unit 130 initiate a key establishment process, as described in more detail below.

Continuing with the example above, the authentication unit 126 can generate a device key pair that includes a device private key and a device public key. The user device 102 can use the device private key during the key establishment process, such as described below with reference to FIG. 4. The key establishment process can include performing an association request that includes the authentication unit 126 providing the device public key to the authentication unit 130 via link 112. The key establishment process includes the authentication unit 126 and the authentication unit 130 generating a secure key, such as a pairwise master key (PMK).

The authentication unit 126 and the authentication unit 130 then initiate a network security process based on the key establishment process. The authentication unit 126 and the authentication unit 130 can use the secure key to perform the network security process, such as a WPA2 authentication. Once the network security process is completed, network access can be provided to the user device 102 by the AP 106 via the link 112, or via another link and/or another AP.

In another embodiment of the network access authentication process, a public key exchange is performed during a customer transaction between the user device 102 and the POS device 104, as described below with reference to FIG. 6. The customer transaction (such as a payment transaction) can be conducted between the transaction unit 120 and the transaction unit 116 over the OOB channel 108. For example, a payment transaction can include a customer using the user device 102 to provide a payment to the POS 108 via the OOB channel 108 using communication protocols, such as NFC protocols or Bluetooth protocols. Prior to the customer transaction being initiated, the authentication unit 130 can generate an AP key pair and then provide the POS device 104 with an AP public key of the AP key pair. Furthermore, prior to the customer transaction being initiated, the authentication unit 126 can also generate a device key pair that includes a device public key and a device private key.

As part of the customer transaction, the transaction unit 116 receives the device public key from the transaction unit 120, and the transaction unit 120 receives the AP public key from the transaction unit 116. The network communication unit 114 can communicate the device public key to the network communication unit 132. Once the user device 102 receives the AP public key and the AP 106 receives the device public key, the authentication unit 126 and the authentication unit 130 initiate a key establishment process. Similar to the embodiment described above, the key establishment process can include generation of a secure key (e.g., a PMK). The authentication unit 126 and the authentication unit 130 can use the secure key to perform a network security process. Once the network security process is completed, the user device 102 can be provided with network access by the AP 106.

In yet another embodiment of the network access authentication process, a direct exchange of a secure key (such as a PMK) is utilized, as described below with reference to FIG. 5. The transaction unit 116 of the POS device 104 processes a customer transaction between a customer and a merchant. Upon receiving an indication of the customer transaction, the POS device 104 requests (e.g., using link 110) network access from the AP 106. Upon receiving the network access request, the authentication unit 130 generates a secure key. The authentication unit 130 provides, over the link 110, the secure key to the network communication unit 114. The transaction unit 116 then provides the secure key to the transaction unit 120 via the OOB channel 108. For example, the transaction unit 116 can print the secure key on a receipt (e.g., using a QR code), email, or text (i.e., using SMS or MMS) the secure key to the transaction unit 120. The authentication unit 126 and the authentication unit 130 can then initiate a network security process using the secure key, i.e., via link 112. Example operation of this and other embodiments are described in more detail with reference to the Figures below.

Figure 2:
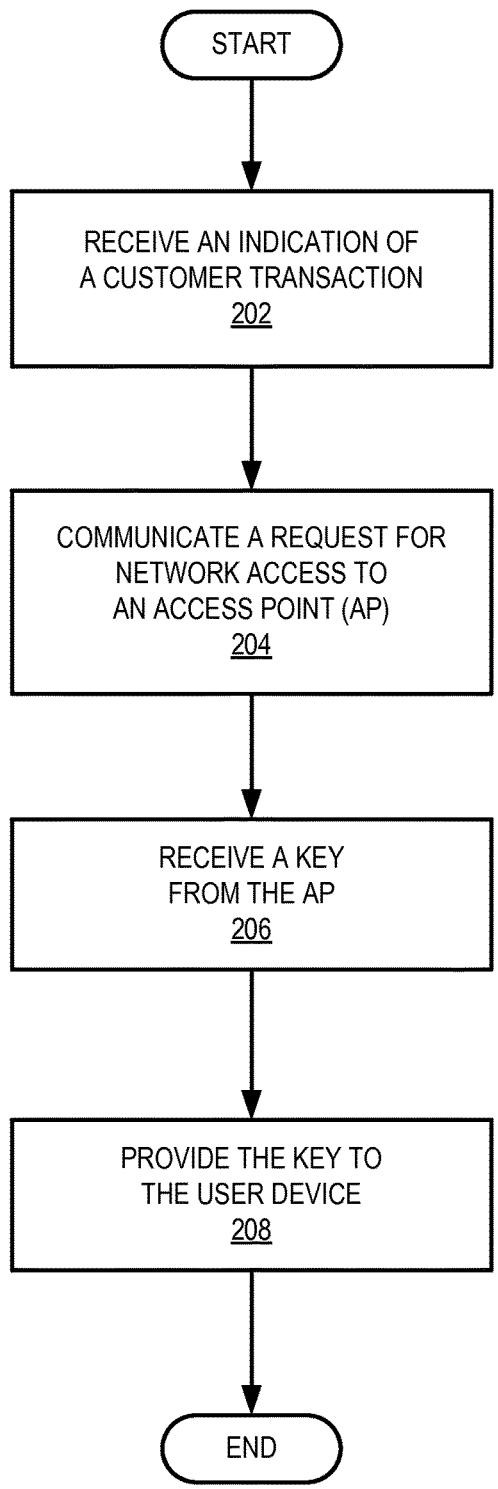
FIGS. 2 and 3 show flow diagrams illustrating example network access authentication processes.

FIG. 2 depicts a flow diagram 200 illustrating a network access authentication process, according to some embodiments. The flow diagram 200 is described with reference to the systems and components described in FIG. 1 (for illustration purposes and not as a limitation). The example operations can be carried out by one or more components in system 100, such as the network communication unit 114 and the transaction unit 116 of the POS device 104.

Beginning with block 202, the POS device 104 receives an indication of a customer transaction that uses the POS device 104. As described above with reference to FIG. 1, an indication can be implemented as a message, a notification, or a control packet. The indication can include data associated with the customer transaction.

As also described above with reference to FIG. 1, the customer transaction can be a transaction for a purchase of goods or services. In one implementation, the customer can manually provide a payment to the POS device 104, without using the user device 102. The customer can, for example, provide payment data to the POS device 104 using a credit card or a smartcard. In one example, payment data received from the credit card or the smartcard can be an indication of the customer transaction. In another example, the POS device 104 can generate an indication of the customer transaction upon processing the received payment data.

In another implementation, the customer can pay for goods being purchased using the user device 102, such as by selecting an option in a display of the user device 102 to initiate an electronic payment transaction with the POS device 104. The transaction unit 116 can receive the indication of the customer transaction from the transaction unit 120 of the user device 102 over the OOB channel 108 or via another channel. For example, the transaction unit 116 can receive the payment data from the transaction unit 120.

Proceeding to block 204, in response to receiving the indication of the customer transaction, the POS device 104 communicates a request for network access to the AP 106. For example, the network communication unit 114 of the POS device 104 can communicate, via the link 110, the request for network access to the network communication unit 132 of the AP 106.

In one embodiment, as described below with reference to FIG. 4, the AP 106 can generate an AP key pair upon receiving the request for network access. In another embodiment, as described below with reference to FIG. 5, the AP 106 can generate a secure key upon receiving the request for network access.

Proceeding to block 206, the POS device 104 receives a key from the AP 106. For example, the network communication unit 114 receives the key from the network communication unit 132 via the link 110. In the embodiment of FIG. 4, the POS device 104 receives an AP public key of the AP key pair. In the embodiment of FIG. 5, the POS device 104 receives the secure key.

Proceeding to block 208, the POS device 104 provides the key to the user device 102. The user device 102 is configured to use the key to obtain network access to the network. The key can be provided to the user device 102 without changing a format of the key. The POS device 104 thus maintains the consistency of the received key (that was generated by the AP 106) when providing the key to the user device 102.

Figure 4:
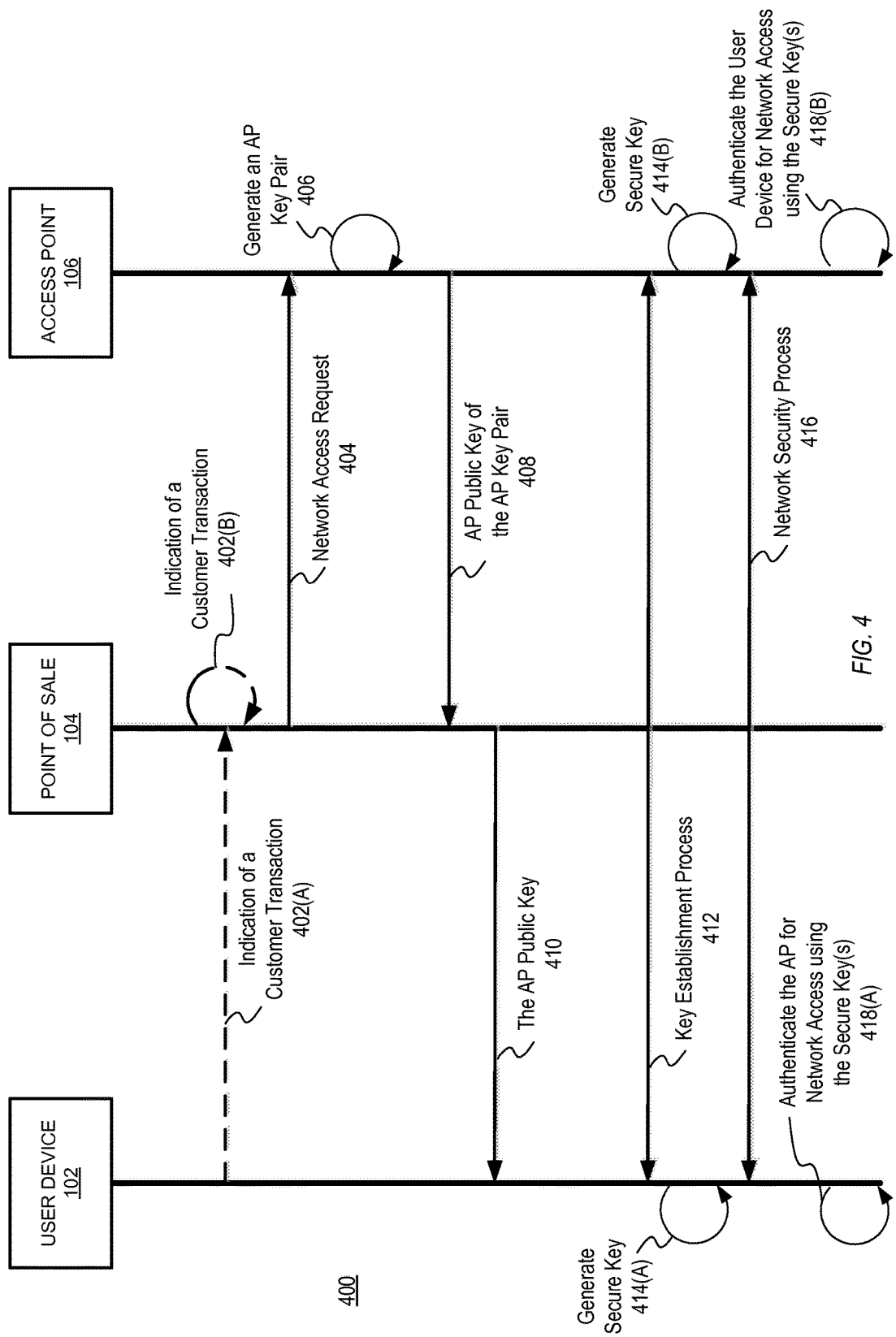
FIG. 4 is a diagram illustrating an embodiment of operations of a network access authentication process.

In the embodiment of FIG. 4, the POS device 104 can provide the AP public key to the user device 102. For example, the transaction unit 116 can provide the AP public key to the transaction unit 120 over the OOB channel 108. Once the user device 102 receives the AP public key, the authentication unit 126 and the authentication unit 130 initiate a key establishment process and then a network security process based on the AP key pair (i.e., the key pair generated by the AP 106).

Figure 5:
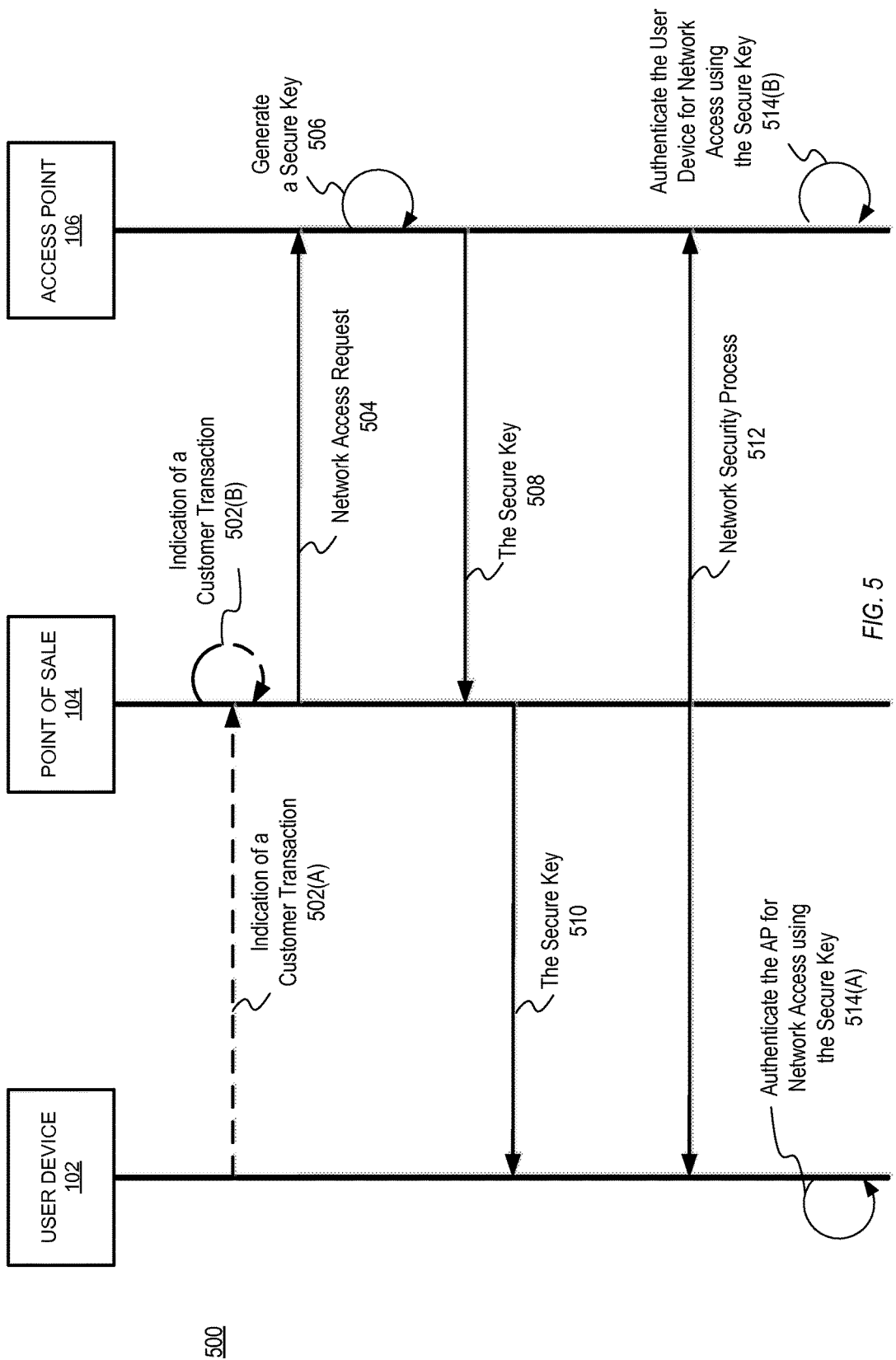
FIG. 5 is a diagram illustrating another embodiment of operations of a network access authentication process.

In the embodiment of FIG. 5, the POS device 104 can provide the secure key to the user device 102. For example, the transaction unit 116 can provide the secure key to the transaction unit 120 via the OOB channel 108. The authentication unit 126 and the authentication unit 130 can initiate a network security process using the secure key, e.g., via link 112.

Figure 3:
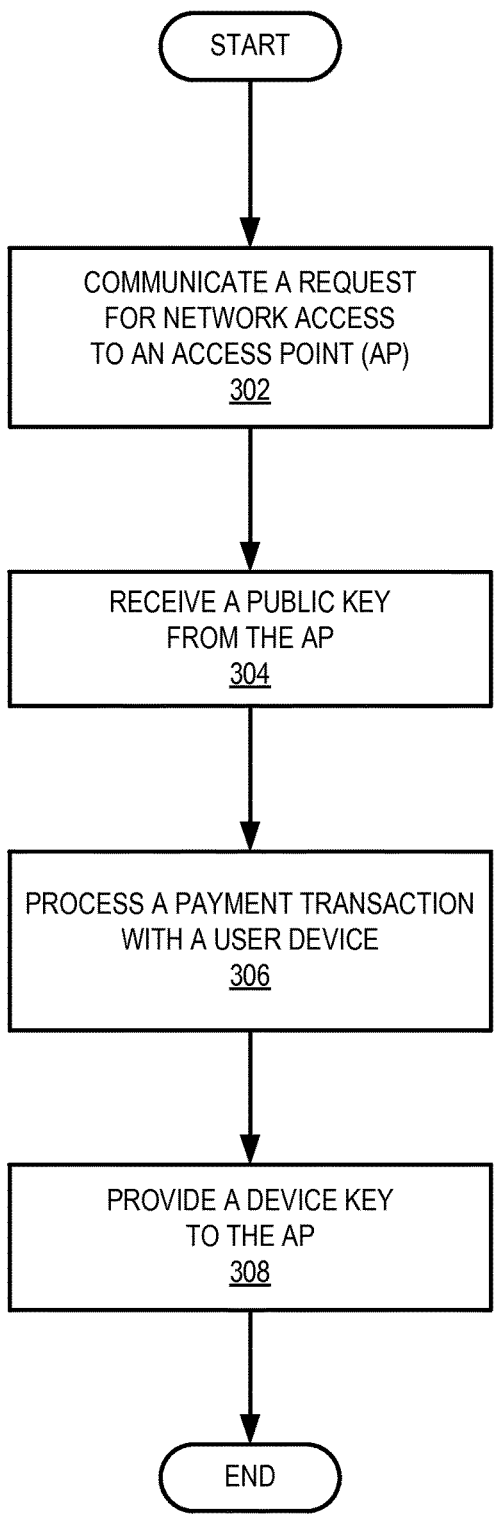

FIG. 3 depicts a flow diagram 300 illustrating a network access authentication process, according to some embodiments. The flow diagram 300 is described with reference to the systems and components described in FIG. 1 (for illustration purposes and not as a limitation). The example operations can be carried out by one or more components in system 100, such as the network communication unit 114 and the transaction unit 116 of the POS device 104.

Beginning with block 302, the POS device 104 communicates a request for network access to the AP 106. For example, the network communication unit 114 can communicate, via the link 110, the request for network access to the network communication unit 132 of the AP 106. In one embodiment, as described below with reference to FIG. 6, the AP 106 can generate a AP key pair upon receiving the request for network access.

Proceeding to block 304, the POS device 104 receives an AP public key of the AP key pair from the AP 106. For example, the network communication unit 114 can receive the AP public key from the network communication unit 132 via the link 110.

Proceeding to block 306, the POS device 104 processes a payment transaction with the user device 102. For example, the user device 102 can include a payment application that can be used to pay for goods from the POS device 104. The customer can select electronic payment in the payment application, such as to select a form of payment. The payment application on the user device 102 can then initiate the payment transaction. The payment transaction can be performed between the transaction unit 120 and the transaction unit 116 via the OOB 108, such as by using NFC protocols or Bluetooth protocols, etc.

The processing of the payment transaction includes the POS device 104 providing the AP public key to the user device 102 and receiving a device public key of a device key pair from the user device 102. For example, the transaction unit 116 can receive, via the OOB channel 108, the device public key from the transaction unit 120 along with payment data of the payment transaction. As part of the payment transaction, the transaction unit 116 can communicate, via the OOB channel 108, the AP public key to the transaction unit 120.

It is noted that the POS device 104 can communicate the request for network access (of block 302) and receive the AP public key from the AP 106 prior to processing the payment transaction from the user device 102 of block 306. However, in one embodiment, the POS device 104 can receive the AP public key from the AP 106 (of block 304) at substantially the same time as processing the payment transaction from the user device 102 (of block 306).

Proceeding to block 308, the POS device 104 can provide the device public key to the AP 106. For example, the network communication unit 114 can provide the device public key to the network communication unit 132. As discussed in more detail below with reference to FIG. 6, once the user device 102 receives the AP public key, the authentication unit 126 and the authentication unit 130 initiate a key establishment process and a network security process based on the AP key pair and on the device key pair.

FIG. 4 is a message flow diagram showing operations performed by the user device 102, the POS device 104, and the AP 106 during a network access authentication process, according to some embodiments.

The POS device 104 receives an indication of a customer transaction that uses the POS device 104 via either 402A or 402B (as showed by the dashed lines). At 402A, the POS device 104 can receive an indication of a customer transaction from the user device 102. The indication of the customer transaction (e.g., payment data) can be communicated over an out-of-band (OOB) channel, such as the OOB 108.

Alternatively, at 402B, the POS device 104 can receive the indication of the customer transaction as part of payment data that is provided without using the user device 102. For example, the customer can manually provide a payment to the POS device 104 without using the user device 102. The indication of the customer transaction can be the received payment data, such as credit card or smart card information. The POS device 104 can also locally generate and store an indication of the customer transaction (e.g., a flag) upon receiving or processing the payment data.

At 404, upon receiving the indication of the customer transaction, the POS device 104 communicates a network access request to the AP 106. The network communication unit 114 can communicate the network access request to the network communication unit 132 via a network, such as by using the link 110.

At 406, upon receiving the network access request, the AP 106 generates an AP key pair. The AP key pair can include an AP private key and an AP public key. In one embodiment, the AP key pair is an asymmetric key pair.

At 408, the AP 106 communicates the public key of the AP key pair to the POS device 104. The network communication unit 132 can communicate the public key to the network communication unit 114 via a network, such as by using the link 110.

At 410, the POS device 104 communicates the public key of the AP key pair to the user device 102. The POS device 104 can communicate the public key to the user device 102 via an OOB channel. In one embodiment, the OOB channel of 410 can be the same OOB channel as used in 402. In another embodiment, the OOB channel used in 410 is different from the OOB channel used in 402.

At 412, the user device 102 and the AP 106 initiate a key establishment process. The key establishment process of 412 can include the user device 102 communicating an association request to the AP 106. The key establishment process of 412 can also include the user device 102 communicating a device public key of a device key pair to the AP 106. In some implementations, the user device 102 can generate the device key pair, which includes the device public key and a device private key, prior to initiating the key establishment process of 412 or during the key establishment process of 412. For example, the user device 102 can generate the device key pair upon communicating the customer transaction at 402, upon receiving the AP public key at 410, or upon performing the association request at 412, etc.

At 414A, the user device 102 generates a secure key based, at least in part, on the received AP public key. Similarly, at 414B, the AP 106 generates a secure key based, at least in part, on the received device public key. In one embodiment, the secure keys generated by the user device 102 and by the AP 106 are symmetric keys. In one embodiment, the user device 102 and the AP 106 generate the symmetric keys concurrently based, at least in part, on the association request of 412. In one embodiment, at 414A and 414B, the user device 102 and the AP 106 generate a single secure key which is then stored by both the user device 102 and by the AP 106.

The user device 102 and the AP 106 can generate the secure key(s) based on, at least in part, Diffie-Hellman (DH), Simultaneous Authentication of Equals (SAE), Wi-Fi Protected Setup (WPS) or any other technically feasible key establishment process between the user device 102 and the AP 106. The secure key(s) can be subsequently used directly, or derived using a key derivation algorithm, in order to be used in a network security process. The network security process can be implemented using an authentication protocol relying on symmetric key(s), such as a 4-way handshake authentication specified by Wi-Fi Protected Access™ (WPA™ or WPA2™), or by Wired Equivalent Privacy (WEP). The secure key can be implemented as a pairwise master key (PMK), a pairwise transient key (PTK), or a pre-shared key (PSK).

At 416, the user device 102 and the AP 106 perform a network security process. The network security process is performed using the secure key(s), or a derivative thereof, such as the PMK key(s). For example, the user device 102 and the AP 106 can perform network security process using the secure key(s) according to the WPA or the WPA2 protocol, the WEP protocol, or other network security processes. It is noted that although WEP and WPA/WPA2 are typically used with WLAN networks, the use of other networks and/or network security processes are contemplated.

At 418A, the user device 102 authenticates the AP 106 for network access using the secure key(s). For example, the authentication unit 126 authenticates the AP 106 based on the network security process of 416. At 418B, the AP 106 authenticates the user device 102 for network access using the secure key(s). For example, the authentication unit 130 authenticates the user device 102 based on the network security process of 416. After obtaining network access from the mutual authentication process of 418A and 418B, the user can access the Internet or other network resources via a browser or other application running on the user device 102.

It is noted that in some embodiments, a hash of a public key is communicated instead of the public key itself. Use of hashing may provide an additional layer of cryptographic security. For example, at 408, the AP 106 can communicate a hash of the AP public key of the AP key pair to the POS device 104. At 410, the POS device 104 can communicate the hash of the AP public key to the user device 102. The user device 102 can then verify the AP public key received within the Key Establishment process 412 matched the received hash, and proceed with 412.

FIG. 5 is a message flow diagram showing operations performed by the user device 102, the POS device 104, and the AP 106, according to some embodiments.

The POS device 104 receives an indication of a customer transaction that uses the POS device 104 via either 502A or 502B (as showed by the dashed lines). At 502A, the POS device 104 can receive an indication of a customer transaction from the user device 102. The indication of the customer transaction (e.g., payment data) can be communicated over an OOB channel.

Alternatively, at 502B, the POS device 104 can receive the indication of the customer transaction as part of payment data that is provided without using the user device 102. For example, similar to the technique described above with reference to 402B, the POS device 104 can receive a payment from a customer via a credit card or a smart card. The indication of the customer transaction can be the received payment data, such as credit card or smart card information. The POS device 104 can also locally generate and store an indication of the customer transaction (e.g., a flag) upon receiving or processing the payment data.

At 504, upon receiving the indication of the customer transaction, the POS device 104 communicates a network access request to the AP 106. The network communication unit 114 can communicate the network access request to the network communication unit 132 via a network, such as by using the link 110.

At 506, upon receiving the network access request, the AP 106 generates a secure key. It is noted that in contrast to the embodiments described with reference to FIGS. 4 and 6, only the AP 106 generates the secure key, i.e., without using a key establishment process and/or without implementing an authentication protocol based on asymmetric keys exchanged between the user device 102 and the AP 106. In one embodiment, the secure key is a symmetric key. The secure key can be implemented as a pairwise master key (PMK), a pairwise transient key (PTK), or a pre-shared key (PSK).

At 508, the AP 106 communicates the secure key to the POS device 104. The network communication unit 132 can communicate the secure key to the network communication unit 114 by using link 110.

At 510, the POS device 104 communicates the secure key to the user device 102. The POS device 104 can communicate the secure key to the user device 102 via an OOB channel. In one embodiment, the OOB channel of 410 can be the same OOB channel as used in 502. In another embodiment, the OOB channel of 510 is different from the OOB channel used in 502.

At 512, the user device 102 and the AP 106 perform a network security process. The network security process is performed using the secure key, or a derivative of the secure key that is obtained using a key derivation algorithm. For example, the user device 102 and the AP 106 can perform network security process using the secure key according to the Wi-Fi Protected Access (WPA) or the WPA2 protocol, the Wired Equivalent Privacy (WEP) protocol, or other network security processes. It is noted that although WEP and WPA/WPA2 are typically used with WLAN networks, the use of other networks and corresponding network security processes are contemplated.

At 514A, the user device 102 authenticates the AP 106 for network access using the secure key. For example, the authentication unit 126 authenticates the AP 106 based on the network security process of 512. At 514B, the AP 106 authenticates the user device 102 for network access using the secure key(s). For example, the authentication unit 130 authenticates the user device 102 based on the network security process of 512.

Figure 6:
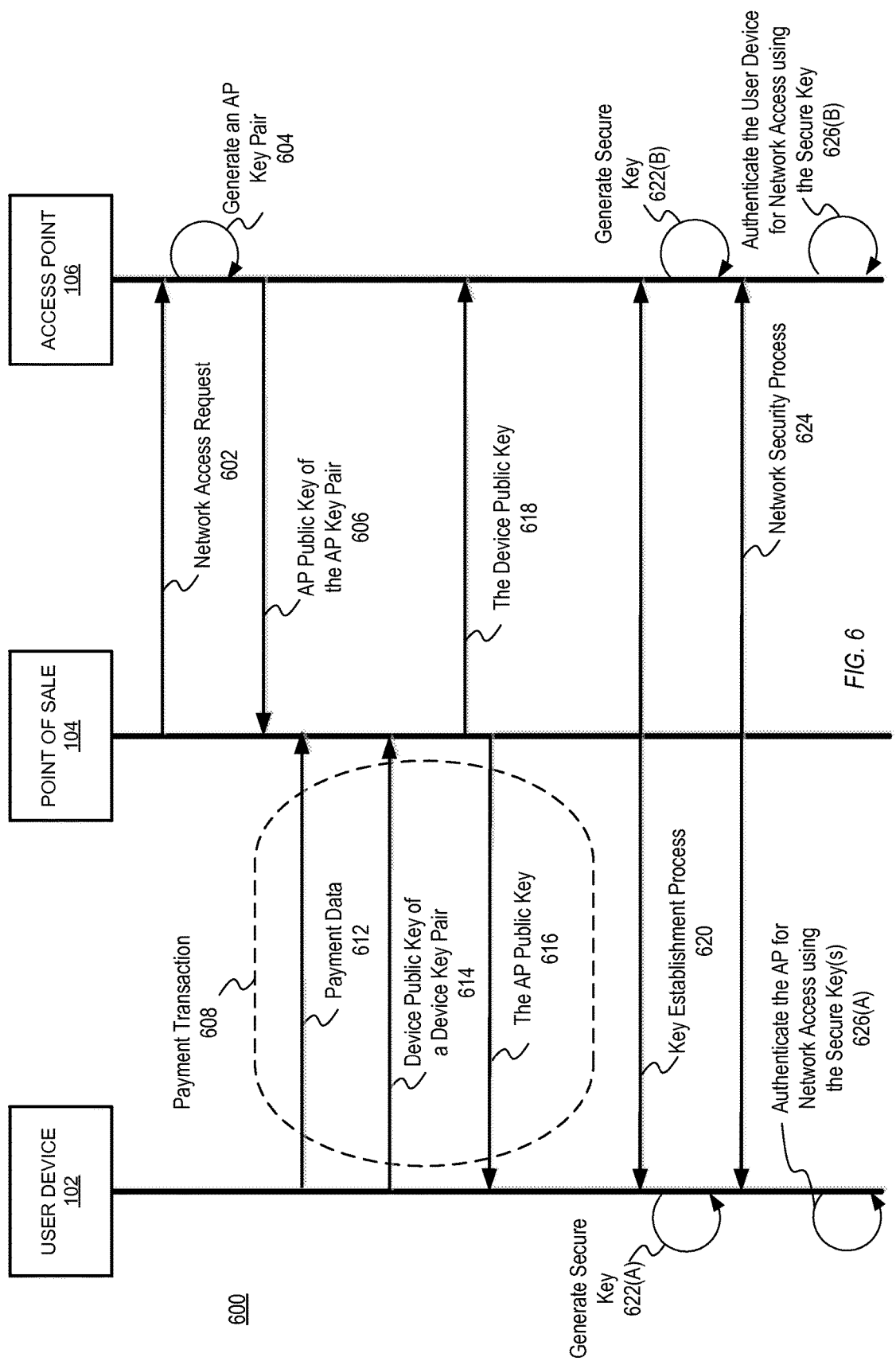
FIG. 6 is a diagram illustrating another embodiment of operations of a network access authentication process.

FIG. 6 is a message flow diagram showing operations performed by the user device 102, the POS device 104, and the AP 106, according to some embodiments.

At 602, the POS device 104 communicates a network access request to the AP 106. The network communication unit 114 can communicate the network access request to the network communication unit 132 by using link 110.

At 604, upon receiving the network access request, the AP 106 generates an AP key pair. The AP key pair can include an AP private key and an AP public key. In one embodiment, the AP key pair is an asymmetric key pair.

At 606, the AP 106 communicates the public key of the AP key pair to the POS device 104. The network communication unit 132 can communicate the public key to the network communication unit 114 by using link 110.

At 608, the user device 102 and the POS device 104 perform a payment transaction. The payment transaction 608 includes the user device 102 communicating, at 612, payment data to the POS device 104. The payment data can indicate money being transferred from customer's bank to a merchant bank, and it may include other information for authentication of such a payment transaction. The user device 102 can communicate the payment data over the OOB channel 108, such as by using NFC protocols or Bluetooth protocols, etc. For example, the user device 102 can include a payment application that can be used to provide the payment to the POS device 104. The payment application can communicate with a financial institution (such as a customer's bank) to authorize payment to the POS device 104. The payment application can then provide the payment authorization to the POS device 104.

The payment transaction of 608 also includes the user device 102 communicating, at 614, a device public key of a device key pair to the POS device 104. The user device 102 can generate the device key pair prior to performing the payment transaction at 608. The user device 102 can keep a device private key of the device key pair, i.e., without communicating the device private key to other devices. The payment transaction 608 also includes the POS device 104 communicating the AP public key of the AP key pair to the user device 102.

In one embodiment, at 614, the user device 102 can communicate the device public key to the POS device 104 over the same OOB channel the user device 102 used to communicate the payment data 612. In one embodiment, at 616 the POS device 104 can communicate the AP public key to the user device 102 over the same OOB channel as the communication of the payment data at 612 and/or the communication of the device public key at 614, such as by using NFC protocols or Bluetooth protocols, etc.

At 618, the POS device 104 communicates the device public key to the AP 106. For example, the network communication unit 114 communicates the device public key to the network communication unit 132 via link 110.

At 620, the user device 102 and the AP 106 initiate a key establishment process. The key establishment process of 620 can include the user device 102 communicating an association request to the AP 106.

At 622A, the user device 102 generates a secure key based, at least in part, on the received AP public key. Similarly, at 622B, the AP 106 generates a secure key based, at least in part, on the received device public key. In one embodiment, the secure keys generated by the user device 102 and by the AP 106 are symmetric keys. In one embodiment, the user device 102 and the AP 106 generate the symmetric keys concurrently based, at least in part, on the association request of the key establishment process of 620. In one embodiment, at 414A and 414B, the user device 102 and the AP 106 generate a single secure key which is then stored by both the user device 102 and by the AP 106.

Similar to the technique described above with reference to 414A and 414B of FIG. 4, at 622A and at 622B, respectively, the user device 102 and the AP 106 can generate the secure key(s) based on, at least in part, Diffie-Hellman (DH), Simultaneous Authentication of Equals (SAE), Wi-Fi Protected Setup (WPS) or any other technically feasible key establishment process. The secure key(s) can be implemented as a pairwise master key (PMK), a pairwise transient key (PTK), or a pre-shared key (PSK).

Similar to the technique described above with reference to 416 of FIG. 4, at 624 the user device 102 and the AP 106 can perform a network security process. The network security process is performed using the secure key(s), such as the PMK key(s). For example, the user device 102 and the AP 106 can perform the network security process using the secure keys according to the Wi-Fi Protected Access (WPA) or the WPA2 protocol, the Wired Equivalent Privacy (WEP) protocol, or other network security processes. It is noted that although WEP and WPA/WPA2 are typically used with WLAN networks, the use of other networks and corresponding network security processes are contemplated.

At 626A, the user device 102 authenticates the AP 106 for network access using the secure key(s). For example, the authentication unit 126 authenticates the AP 106 based on the network security process of 624. At 626B, the AP 106 authenticates the user device 102 for network access using the secure key(s). For example, the authentication unit 130 authenticates the user device 102 based on the network security process of 624.

Similar to the technique described above with reference to FIG. 4, a hash of a public key can be communicated instead of the public key itself. For example, at 608, the AP 106 can communicate a hash of the AP public key of the AP key pair to the POS device 104. Similarly, at 618, the POS device 104 can communicate a hash of the device public key of the device key pair to the AP 106.

As will be appreciated in light of the disclosure, the flow diagrams of FIGS. 2 and 3, and/or of FIGS. 4-6, may be modified in order to derive alternative aspects of the disclosure. Also, some operations in this aspect of the disclosure are shown in sequential order. However, certain operations may occur in a different order than shown, certain operations may be performed concurrently, certain operations may be combined with other operations, and certain operations may be absent in another aspect of the disclosure.

As will be appreciated by one skilled in the art, aspects of the present disclosure may be embodied as a system, method, or computer program product. Accordingly, aspects of the present disclosure may take the form of an entirely hardware embodiment, a software embodiment (including firmware, resident software, micro-code, etc.) or an embodiment combining software and hardware aspects that may all generally be referred to herein as a "circuit," "module," "unit," or "system." Furthermore, aspects of the present disclosure may take the form of a computer program product embodied in one or more computer readable medium(s) having computer readable program code embodied thereon.

Any combination of one or more non-transitory computer readable medium(s) may be utilized. Non-transitory computer-readable media comprise all computer-readable media, with the sole exception being a transitory, propagating signal. The non-transitory computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code embodied on a computer readable medium for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 7:
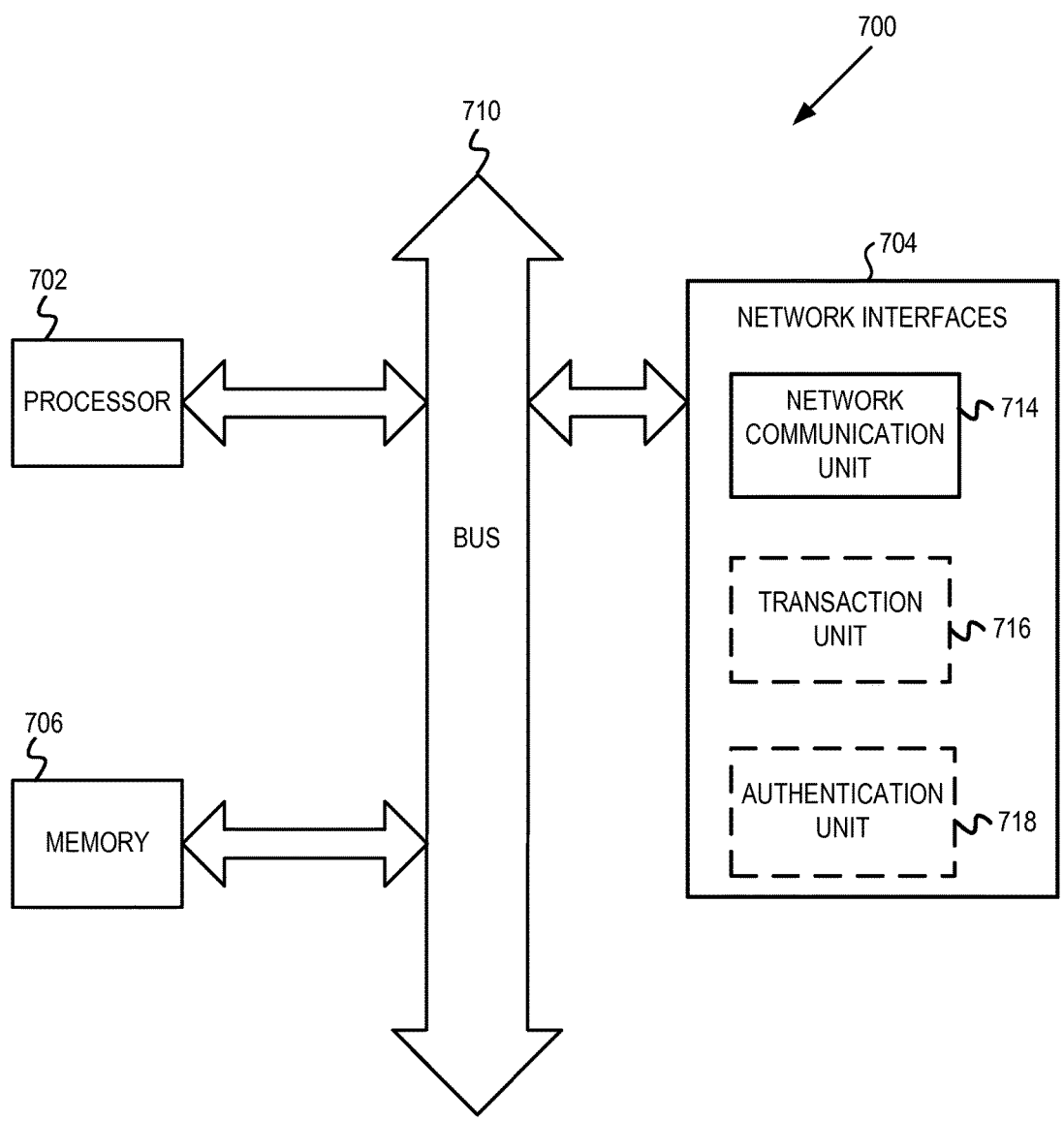
FIG. 7 is a block diagram of an exemplary embodiment of an electronic device including an interface for network communications.

FIG. 7 is a block diagram of one embodiment of an electronic device 700. The electronic device 700 can implement the functionalities and perform the operations described above in FIGS. 1-6 of a user device, a POS device, or an AP, as will be further described below. The electronic device includes a processor 702 (possibly including multiple processors, multiple cores, multiple nodes, and/or implementing multi-threading, etc.). The electronic device includes a memory 706. The memory 706 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The electronic device also includes a bus 710 (e.g., PCI, ISA, PCI-Express, HyperTransport®, InfiniBand®, NuBus, etc.), and network interfaces 704 that include at least one of a wireless network interface (e.g., a WLAN interface, a Bluetooth® interface, a WiMAX interface, a ZigBee® interface, a Wireless USB interface, etc.) and a wired network interface (e.g., a PLC interface, an Ethernet interface, etc.).

In some embodiments, the network interfaces 704 may include a network communication unit 714. Also, the network interfaces 704 may optionally include a transaction unit 716 and an authentication unit 718 (as shown by the dashed lines). For example, if the electronic device 700 is a user device (e.g., the user device 102 of FIG. 1), the network interfaces 704 may include the network communication unit 714, the transaction unit 716, and the authentication unit 718. In another example, if the electronic device 700 is a POS device (e.g., the POS device 104 of FIG. 1), the network interfaces 704 may include the network communication unit 714 and the transaction unit 716. In yet another example, if the electronic device 700 is an AP (e.g., the AP 106 of FIG. 1), the network interfaces 704 may include the network communication unit 714 and the authentication unit 718. In some embodiments, the network interfaces 704, the processor 702, and the memory 706 can implement the functionalities described above in FIGS. 1-6. For example, the network interfaces 704, the processor 702, and the memory 706 can implement the functionalities of the network communication unit 714, the transaction unit 716, and/or the authentication unit 718.

It is further noted that any one of these functionalities may be partially (or entirely) implemented in hardware and/or on the processor unit 702. For example, the functionality may be implemented with an application specific integrated circuit, in logic implemented in the processor unit 702, in a co-processor on a peripheral device or card, etc. Further, realizations may include fewer or additional components not illustrated in FIG. 7 (e.g., video cards, audio cards, additional network interfaces, peripheral devices, etc.). The processor unit 702, the storage device(s), and the network interface 704 are coupled to the bus 710. Although illustrated as being coupled to the bus 710, the memory unit 706 may be coupled to the processor unit 702.

While the embodiments are described with reference to various implementations and exploitations, it will be understood that these embodiments are illustrative and that the scope of the disclosure is not limited to them. In general, techniques for facilitating configuring a device for network access (such as for guest network access) as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of this disclosure. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of this disclosure.

What is claimed is:

1. A method for network access, comprising:
   receiving, at a first device of a network, payment data associated with a payment transaction between the first device and a user device;
   communicating, by the first device, a request for network access for the user device to an access point of the network in response to receiving the payment data associated with the payment transaction;
   receiving, at the first device, a first key from the access point; and
   providing the first key to the user device for the user device to obtain the network access.

2. The method of claim 1, wherein
   the user device is to communicate with the access point to generate a second key, based, at least in part, on the first key, and
   the user device is to further communicate with the access point to obtain access to the network further based on the second key.

3. The method of claim 2, wherein
   the first key is an asymmetric key, and
   the second key is a symmetric key.

4. The method of claim 2, wherein the second key comprises one of:
   a pairwise master key (PMK),
   a pairwise transient key (PTK), or
   a pre-shared key (PSK).

5. The method of claim 1, wherein the first key is provided to the user device using an out-of-band (OOB) channel.

6. The method of claim 5, wherein the OOB channel comprises at least one member of a group consisting of:
   an optical channel,
   a Near Field Communication (NFC) channel,
   a cellular channel, and
   a Bluetooth channel.

7. The method of claim 1, wherein
   the access point is to generate a first key pair including the first key and a second key,
   the first key is a public key, and the second key is a private key,
   the user device is to generate a second key pair that comprises a third key and a fourth key,
   the third key is a public key, and the fourth key is a private key, and
   the user device is to communicate with the access point to obtain the network access based on the first key pair and the second key pair.

8. The method of claim 1, wherein
   the network access is a temporary network access or a guest network access.

9. The method of claim 1, wherein
   a format of the first key generated by the access point is maintained when the first key is provided to the user device.

10. The method of claim 1, wherein
    the access point is to generate the first key in response to receiving the request for the network access, and
    the first key is a symmetric key.

11. The method of claim 1, wherein
    the user device is further to communicate with the access point to obtain the network access based, at least in part, on the first key.

12. A computing device comprising:
    a processor; and
    a memory having program instructions stored therein, the program instructions executable by the processor to cause the computing device to,
    receive payment data associated with a payment transaction between the computing device and a user device;
    communicate a request for network access for the user device to an access point of a network in response to receiving the payment data associated with the payment transaction;
    receive a first key from the access point; and
    provide the first key to the user device for the user device to obtain the network access.

13. The computing device of claim 12, wherein
    the user device is to communicate with the access point to generate a second key, based, at least in part, on the first key, and
    the user device is to further communicate with the access point to obtain access to the network further based on the second key.

14. The computing device of claim 13, wherein
    the first key is an asymmetric key, and
    the second key is a symmetric key.

15. The computing device of claim 13, wherein the second key comprises one of:
    a pairwise master key (PMK),
    a pairwise transient key (PTK), or
    a pre-shared key (PSK).

16. The computing device of claim 12, wherein
    the first key is provided to the user device using an out-of-band (OOB) channel.

17. The computing device of claim 12, wherein
the access point is to generate a first key pair including the first key and a second key,
the first key is a public key, and the second key is a private key,
the user device is to generate a second key pair that comprises a third key and a fourth key,
the third key is a public key, and the fourth key is a private key, and
the user device is to communicate with the access point to obtain the network access based on the first key pair and the second key pair.

18. The computing device of claim 12, wherein
the network access is a temporary network access or a guest network access.

19. The computing device of claim 12, wherein
a format of the first key generated by the access point is maintained when the first key is provided to the user device.

20. The computing device of claim 12, wherein
the access point is to generate the first key in response to receiving the request for the network access, and
the first key is a symmetric key.

21. A method for network access, comprising:
communicating, by a first device of a network, a request for network access to an access point of the network;
receiving, at the first device, a first key from the access point;
processing, by the first device, a payment transaction with a user device, wherein processing the payment transaction comprises,
   receiving payment data and a second key from the user device, and
   in response to receiving the payment data and the second key,
      providing the first key to the user device for the user device to obtain the network access; and
providing the second key to the access point.

22. The method of claim 21, wherein
the user device is to communicate with the access point to generate a third key, based, at least in part, on the first key and on the second key, and
the user device is to further communicate with the access point to obtain the network access further based on the third key.

23. The method of claim 21, wherein
the network access is a temporary network access or a guest network access.

24. The method of claim 21, wherein
the access point is to generate the first key prior to processing of the payment transaction.

25. The method of claim 22, wherein
the payment data and the second key are received via an out-of-band (OOB) channel, and
the first key is provided to the user device using the OOB channel.

26. A computing device comprising:
a processor; and
a memory having program instructions stored therein, the program instructions executable by the processor to cause the computing device to,
   communicate a request for network access to an access point of a network;
   receive a first key from the access point;
   process a payment transaction with a user device, wherein
      processing the payment transaction comprises,
         receiving payment data and a second key from the user device, and
         in response to receiving the payment data and the second key, providing the first key to the user device for the user device to obtain the network access; and
   provide the second key to the access point.

27. The computing device of claim 26, wherein
the user device is to communicate with the access point to generate a third key, based, at least in part, on the first key and on the second key, and
the user device is to further communicate with the access point to obtain the network access further based on the third key.

28. The computing device of claim 26, wherein
the network access is a temporary network access or a guest network access.

29. The computing device of claim 26, wherein
the payment data and the second key are received via an out-of-band (OOB) channel, and
the first key is provided to the user device using the OOB channel.

30. The computing device of claim 26, wherein the access point is to generate the first key prior to processing of the payment transaction.

\* \* \* \* \*